United States Patent
Shinomiya

(10) Patent No.: US 9,451,527 B2
(45) Date of Patent: Sep. 20, 2016

(54) COMMUNICATION APPARATUS, CONTROL METHOD, AND PROGRAM

(71) Applicant: CANON KABUSHIKI KAISHA, Tokyo (JP)

(72) Inventor: Takeshi Shinomiya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/907,557

(22) Filed: May 31, 2013

(65) Prior Publication Data
US 2013/0324042 A1   Dec. 5, 2013

(30) Foreign Application Priority Data
Jun. 4, 2012   (JP) ................................ 2012-127383

(51) Int. Cl.
| H04B 5/00 | (2006.01) |
| H04W 40/24 | (2009.01) |
| H04W 4/00 | (2009.01) |
| H04W 4/02 | (2009.01) |

(52) U.S. Cl.
CPC ............. *H04W 40/24* (2013.01); *H04W 4/008* (2013.01); *H04W 4/023* (2013.01)

(58) Field of Classification Search
CPC ...... H04W 4/00; H04W 40/24; H04W 4/008
USPC .......... 455/41.1, 41.2, 41.3, 11.1, 3.06, 67.7, 455/73, 411
See application file for complete search history.

(56) References Cited

U.S. PATENT DOCUMENTS

| 8,244,917 B2* | 8/2012 | Takayama | H04W 36/14 455/41.1 |
| 8,543,060 B2* | 9/2013 | Mutikainen | H04W 76/043 340/5.61 |
| 2007/0073929 A1* | 3/2007 | Takayama | H04W 36/14 710/51 |
| 2008/0242223 A1* | 10/2008 | Yamada | H04N 1/00307 455/3.06 |
| 2009/0053997 A1* | 2/2009 | Jobling | G06F 3/01 455/41.2 |
| 2010/0034083 A1* | 2/2010 | Prakash | H04W 28/18 370/230.1 |
| 2010/0297939 A1* | 11/2010 | Fujita | H04W 4/00 455/41.1 |
| 2011/0007637 A1* | 1/2011 | Chen | H04M 1/72519 370/252 |
| 2011/0202460 A1* | 8/2011 | Buer | G06Q 20/1085 705/44 |
| 2011/0294422 A1* | 12/2011 | Fuchs | H04L 63/18 455/41.2 |

(Continued)

FOREIGN PATENT DOCUMENTS

| JP | 2004-364145 A | 12/2004 |
| JP | 2008-098893 A | 4/2008 |
| JP | 2010-093430 A | 4/2010 |

*Primary Examiner* — Md Talukder
(74) *Attorney, Agent, or Firm* — Canon USA, Inc., IP Division

(57) ABSTRACT

A communication apparatus includes a first communication unit configured to communicate with another apparatus via a first network, a second communication unit configured to communicate with another apparatus via a second network, and a third communication unit configured to communicate with another apparatus via close-proximity wireless communication. If the proximity of an external apparatus is detected by the third communication unit while not being connected to the second network, a communication parameter used for connection to the second network is shared with the external apparatus by using the third communication unit, and if the proximity of the external apparatus is detected while being connected to the second network formed by another apparatus, the third communication unit transmits a predetermined notification to the external apparatus.

25 Claims, 10 Drawing Sheets

(56) References Cited

U.S. PATENT DOCUMENTS

| | | | | |
|---|---|---|---|---|
| 2011/0294428 A1* | 12/2011 | Hatakeyama | ........ | H04B 5/0056 |
| | | | | 455/41.2 |
| 2012/0096132 A1 | 4/2012 | Lim et al. | | |
| 2012/0099566 A1* | 4/2012 | Laine | .................. | H04M 1/7253 |
| | | | | 370/338 |
| 2012/0220221 A1* | 8/2012 | Moosavi | ......... | H04M 1/274516 |
| | | | | 455/41.1 |
| 2013/0260683 A1* | 10/2013 | Suzuki | .................. | H04W 4/008 |
| | | | | 455/41.1 |
| 2013/0324042 A1* | 12/2013 | Shinomiya | ............ | H04W 40/24 |
| | | | | 455/41.1 |
| 2015/0126124 A1* | 5/2015 | Miyabayashi | ........ | H04W 84/20 |
| | | | | 455/41.2 |

* cited by examiner

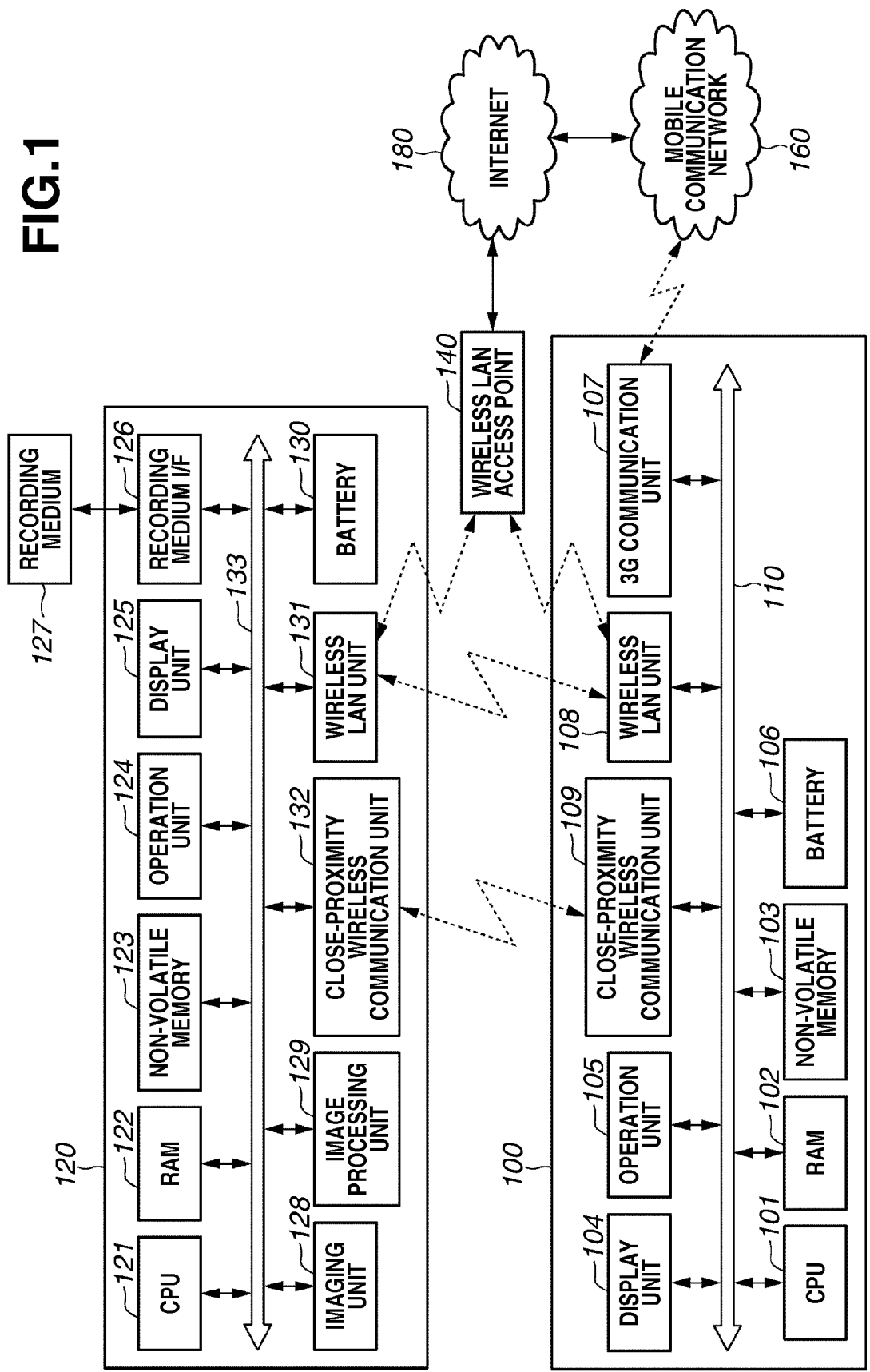

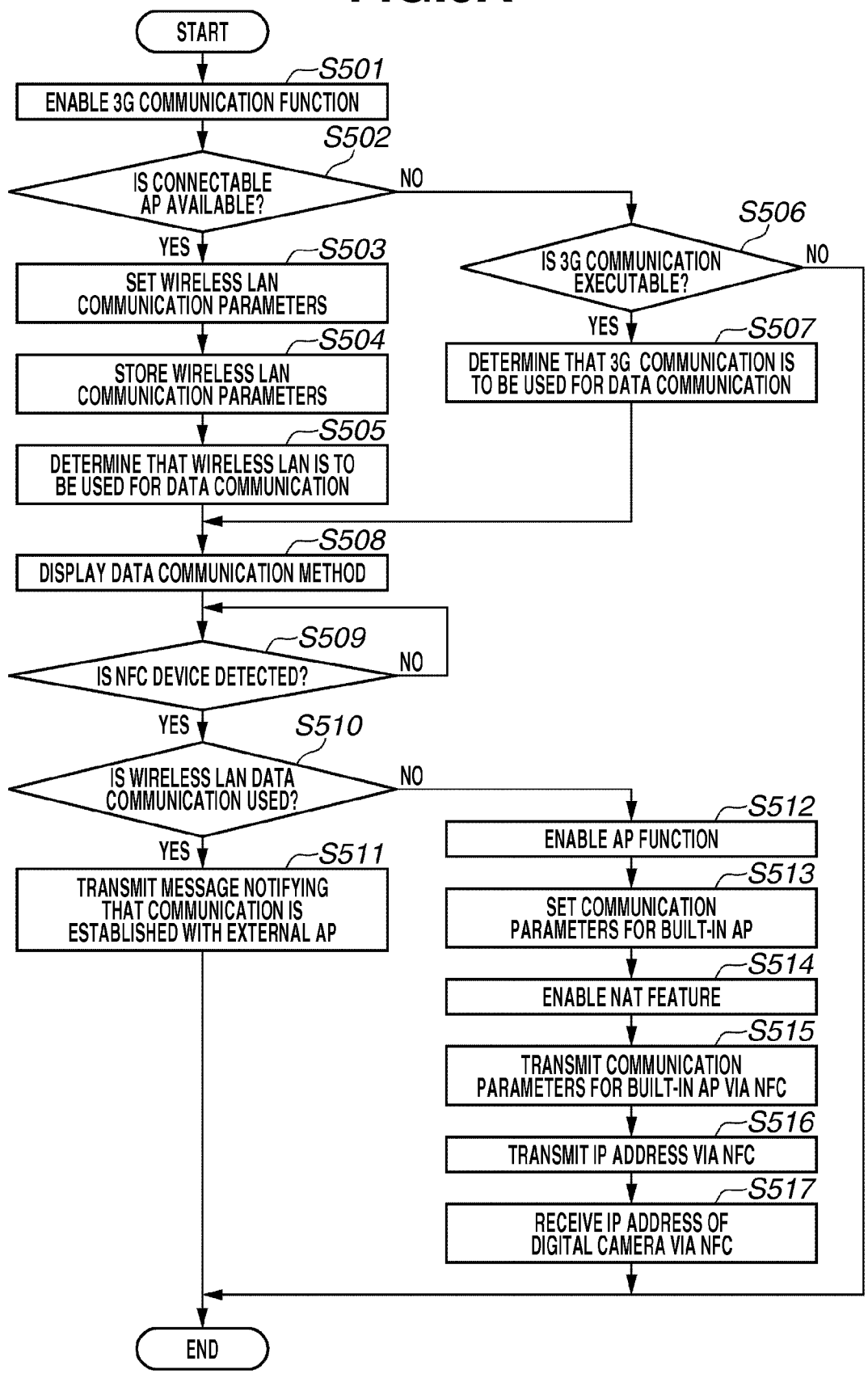

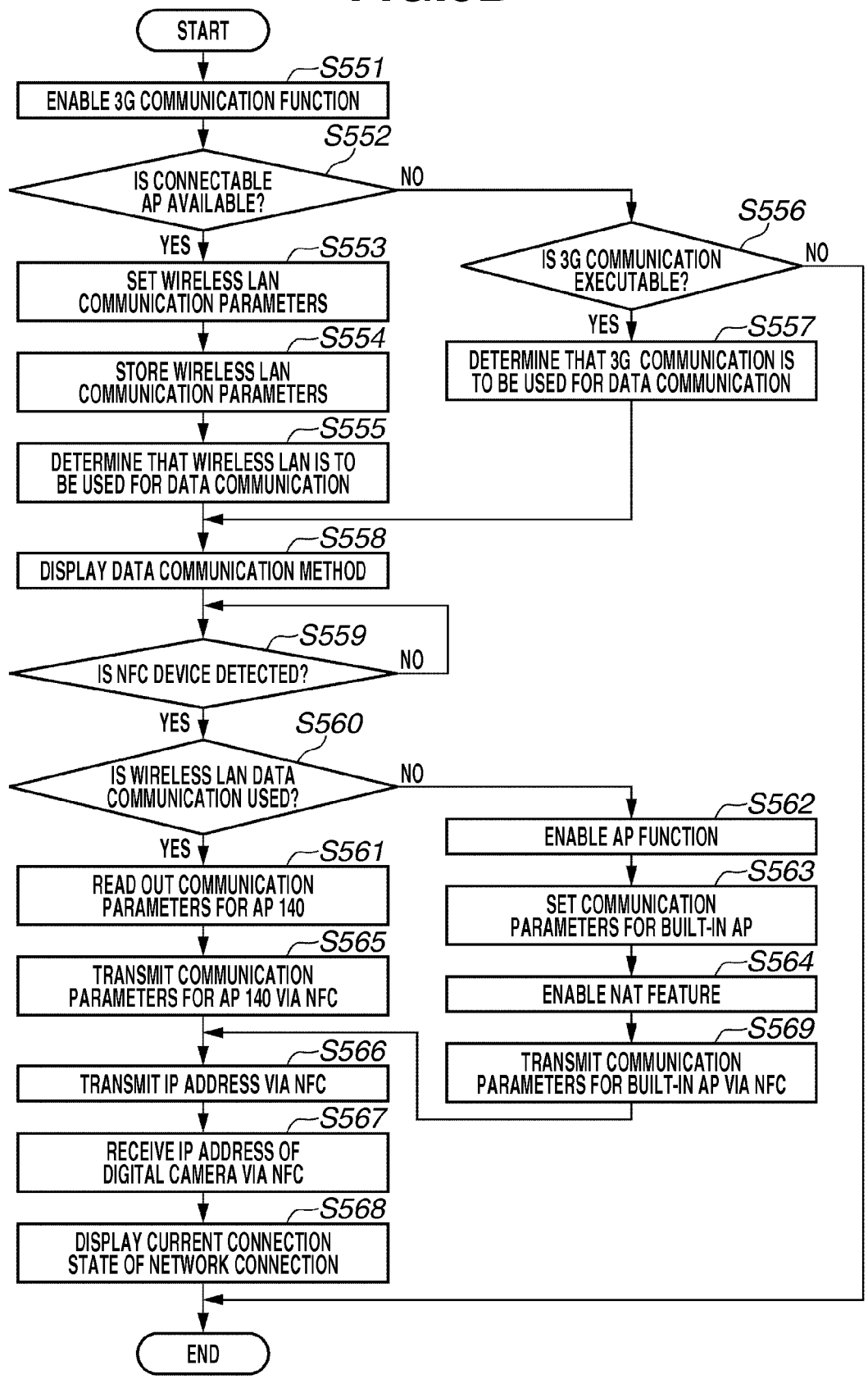

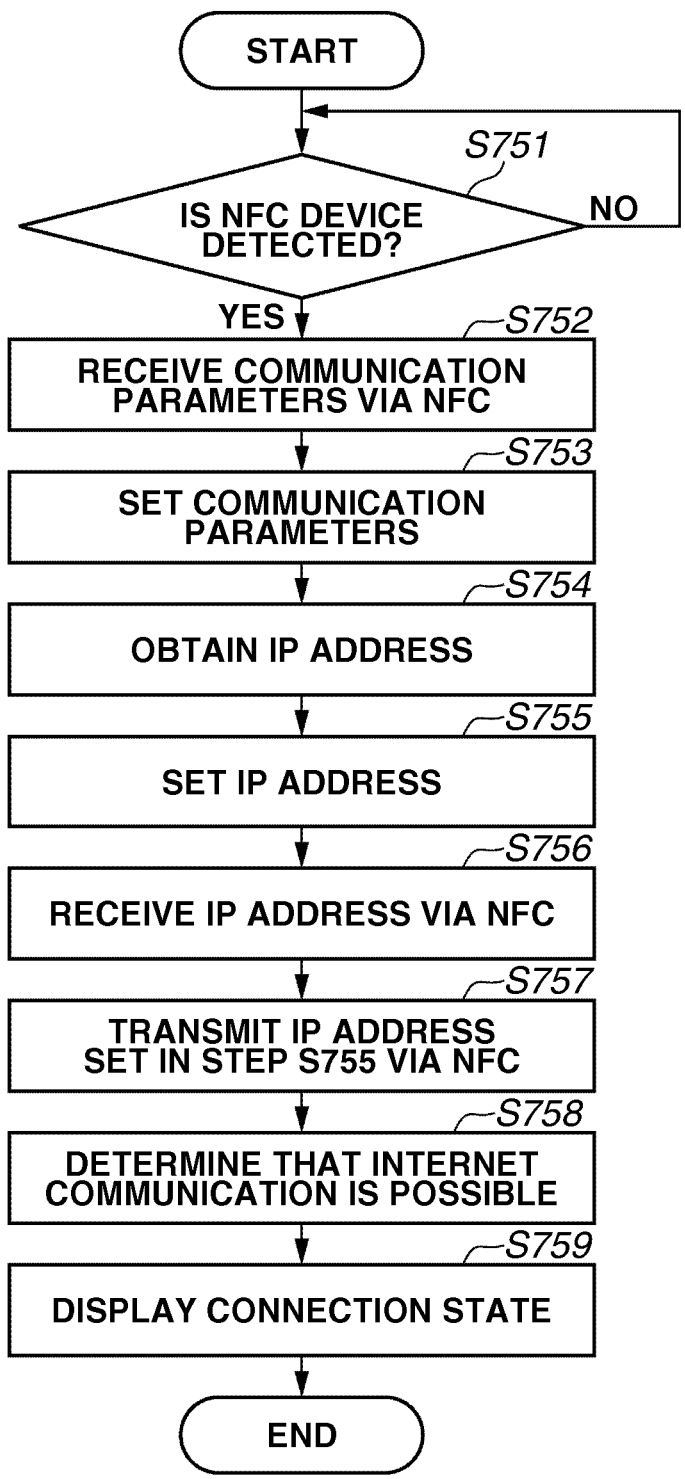

COMMUNICATION APPARATUS, CONTROL METHOD, AND PROGRAM

BACKGROUND

1. Field

Aspects of the present invention generally relate to processing that is performed when communication settings necessary for communication with an external device is set.

2. Description of the Related Art

In recent years, a method for setting connection settings between wireless communication apparatuses by using another wireless communication apparatus has been proposed. For example, a technique called "hand over technique" has been attracting attention. According to this technique, settings for a wireless communication method used by an apparatus is handed over to another apparatus with which the communication is being performed by using a short distance wireless communication method such as Near Field Communication (NFC). Thus the communication is handed over to the apparatus that received the settings.

For example, Japanese Patent Application Laid-Open No. 2004-364145 discusses a technique for identifying a communication apparatus with which the communication is to be performed by performing communication via the NFC and subsequently performing Bluetooth® communication with the identified apparatus.

However, if the settings of predetermined wireless communication are handed over from one apparatus to another via the NFC or the like, for example, the apparatus receiving the settings may already be communicating with a different apparatus by predetermined wireless communication. In such a case, handing over of the settings or the wireless communication which is currently being performed may be stopped.

SUMMARY

An aspect of the present invention generally relates to a communication apparatus including a first communication unit configured to communicate with another apparatus via a first network, wherein the first network is a mobile communication network, a second communication unit configured to communicate with another apparatus via a second network different from the first network, and a third communication unit configured to communicate with another apparatus via close-proximity wireless communication. If the proximity of an external apparatus is detected by the third communication unit while not being connected to the second network, a communication parameter used for connection to the second network is shared with the external apparatus by using the third communication unit, and if the proximity of the external apparatus is detected while being connected to the second network formed by another apparatus, the third communication unit transmits a notification to the external apparatus indicating that the communication apparatus is already connected to the second network.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a block diagram of a communication system according to a first exemplary embodiment.

FIGS. 5A and 5B are flowcharts illustrating an operation of the cellular phone.

FIGS. 7A and 7B are flowcharts illustrating an operation of the digital camera.

DESCRIPTION OF THE EMBODIMENTS

Figure 2A:
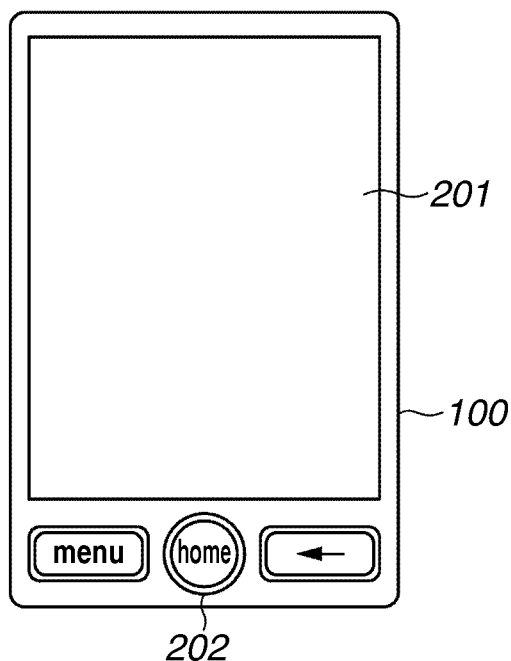
FIGS. 2A, 2B, and 2C illustrate external views of a cellular phone according to the first exemplary embodiment.

Various exemplary embodiments, features, and aspects of the invention will be described in detail below with reference to the drawings.

FIG. 1 illustrates a communication system according to an exemplary embodiment. The communication system according to the present embodiment includes a cellular phone 100 as an example of a communication apparatus and a digital camera 120.

The cellular phone 100 and the digital camera 120 are capable of wireless local area network (LAN) communication. Both the cellular phone 100 and the digital camera 120 can communicate with a wireless LAN access point (AP) 140, which is hereinafter referred to as an AP 140. The cellular phone 100 and the digital camera 120 can be connected to a local area network via the AP 140. The AP 140 includes a router function and can be connected to the Internet 180. Thus, the cellular phone 100 and the digital camera 120 can also be connected to the Internet 180 via the AP 140. The local area network is an example of a second network.

Further, the cellular phone 100 can be connected to a mobile communication network 160. The mobile communication network according to the present embodiment is a third Generation (3G) communication network provided by a mobile service provider. The mobile communication network 160 includes a great number of base stations, an inter-base station network, and gateways to the Internet. The cellular phone 100 can be connected to the Internet 180 via the mobile communication network 160. The mobile communication network is an example of a first network.

The configuration of the cellular phone 100 will now be described. The cellular phone 100 includes a central processing unit (CPU) 101, a random access memory (RAM) 102, a non-volatile memory 103, a display unit 104, an operation unit 105, a battery 106, a 3G communication unit 107, a wireless LAN unit 108, and a close-proximity wireless communication unit 109. All of these components are connected to a system bus 110 in the cellular phone 100.

The CPU 101 controls each unit of the cellular phone 100 according to input signals and various programs. The control performed by the CPU 101 is, for example, communication control, recording control, and display control.

The RAM 102 is a rewritable memory and is used as a work area of a program used for controlling the cellular phone 100. Further, it is used as a buffer of various types of content data and parameters.

The non-volatile memory 103 stores a program for controlling the cellular phone 100 and data such as image data and character data. When the cellular phone 100 is powered on, the CPU 101 reads the program from the non-volatile memory 103 and starts controlling each unit of the cellular phone 100. The non-volatile memory 103 is, for example, a flash memory.

The display unit 104 displays a screen for displaying images and GUIs based on the control of the CPU 101. The display unit 104 includes, for example, a liquid crystal display (LCD) device and a LCD driver unit which controls the LCD device.

The operation unit 105 is used for accepting an instruction submitted by a user. The operation unit 105 according to the present embodiment includes a plurality of buttons and a touch panel provided on the display side of the display unit 104. When the buttons of the operation unit 105 are pressed or coordinates information is detected by the touch panel, such information is submitted to the CPU 101.

The battery 106 is a unit for supplying power necessary for the operation of the cellular phone 100.

The 3G communication unit 107 performs transmission/reception of speech and data between the cellular phone 100 and the mobile communication network 160. The 3G communication unit 107 includes an antenna used for wireless communication and a communication controller that processes wireless signals. The 3G communication unit 107 realizes wireless communication based on W-CDMA (UMTS). According to the control of the CPU 101, the 3G communication unit 107 is connected to one of the base stations of the mobile communication network 160. When the 3G communication unit 107 is connected to a base station, the 3G communication unit 107 performs speech communication or data communication with another cellular phone connected to the mobile communication network 160 or a terminal on the Internet 180. The 3G communication unit 107 is an example of a first communication unit of the cellular phone 100.

The wireless LAN unit 108 is a communication unit that realizes wireless communication in a communication range of approximately several tens of meters. The wireless LAN unit 108 includes an antenna for wireless communication and a communication controller that processes wireless signals. According to the present embodiment, the wireless LAN unit 108 is used for communication with a wireless LAN unit 131 of the digital camera 120 described below and the connection to the Internet 180 via the AP 140. The wireless LAN unit 108 is an example of a second communication unit of the cellular phone 100.

The close-proximity wireless communication unit 109 is a communication unit used for realizing close-proximity communication. The close-proximity communication according to the present embodiment is wireless communication of a communication range of a few to over ten centimeters and is, for example, the NFC or infrared communication. The communication method according to the present embodiment uses the NFC. The close-proximity wireless communication unit 109 includes an antenna for wireless communication, a modulation and demodulation circuit for wireless signal processing, and a communication controller. The close-proximity wireless communication unit 109 realizes, for example, close-proximity communication which conforms to ISO/IEC 14443 or ISO/IEC 18092 by outputting a modulated wireless signal from the antenna and demodulating a wireless signal received via the antenna. The close-proximity wireless communication unit 109 according to the present embodiment is used for the communication with a close-proximity wireless communication unit 132 of the digital camera 120 described below. The close-proximity wireless communication unit 109 is an example of a third communication unit of the cellular phone 100.

Next, the digital camera 120 will be described. A CPU 121 controls the entire digital camera. The CPU 121 controls each unit of the digital camera 120 according to input signals and various programs. The control performed by the CPU 121 is, for example, communication control, recording control, display control, and imaging control.

Functions of each of a RAM 122, a non-volatile memory 123, an operation unit 124, and a display unit 125 of the digital camera 120 are substantially similar to those of the corresponding components of the cellular phone 100. Thus, their descriptions are not repeated.

A storage medium I/F 126 is an interface for attaching a storage medium 127 which is, for example, a memory card. The CPU 121 controls reading of data from the storage medium 127 attached to the storage medium I/F 126. Further, the CPU 121 controls writing of data in the storage medium 127.

The storage medium 127 is a rewritable non-volatile memory, such as a secure digital (SD) card, for storing captured image data.

An imaging unit 128 includes an image sensor which converts an optical image of an object into an electrical video signal and outputs the video signal to an internal bus 133. A complementary metal oxide semiconductor (CMOS) image sensor or a charge-coupled device (CCD) image sensor is used for the image sensor.

An image processing unit 129 performs various types of image processing on the image data stored in the non-volatile memory 123 or the storage medium 127, or a video signal output from the imaging unit 128. The image processing can be performed without using the image processing unit 129 depending on the type of the image processing. If the image processing is performed without using the image processing unit 129, the CPU 121 may perform the image processing according to a program.

Functions of each of a battery 130, the wireless LAN unit 131, and the close-proximity wireless communication unit 132 are substantially similar to those of the corresponding components of the cellular phone 100. Thus, their descriptions are not repeated.

Figure 2B:
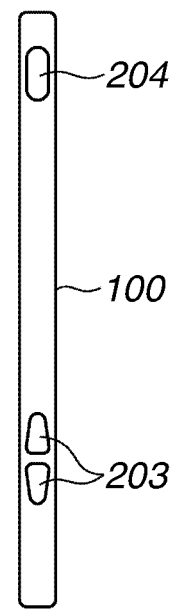
Figure 2C:
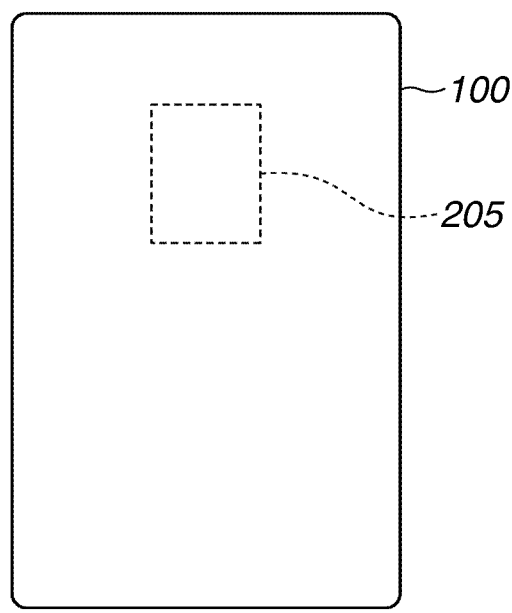

FIGS. 2A, 2B, and 2C illustrate external views of the cellular phone 100. The illustrations correspond to the front view, the side view, and the rear view of the cellular phone 100, respectively.

A liquid crystal display 201 includes a touch panel. The liquid crystal display 201 is included in the operation unit 105 and the display unit 104 illustrated in FIG. 1. The user can operate the GUI displayed on the liquid crystal display 201 by touching the liquid crystal display 201. Operation buttons 202 are included in the operation unit 105. The user can change the function of the cellular phone 100 and operate the GUI displayed on the display unit 104 not only by touching the touch panel but by using these buttons. Volume buttons 203 are included in the operation unit 105. By using these buttons, the user can control the volume level of speech communication. A power button 204 is also included in the operation unit 105. The user can power on/off the cellular phone 100 by operating this button.

A close-proximity wireless communication area 205 is where an antenna of the close-proximity wireless communication unit 109 is provided. If the antenna of the close-proximity wireless communication unit 132 of the digital camera 120 comes nearer to this area of the cellular phone 100, communication between the close-proximity wireless communication unit 109 and the close-proximity wireless communication unit 132 becomes possible. The range of the close-proximity wireless communication area 205 is not fixed and may vary depending on the external environment and the output power of the antenna.

Figure 3A:
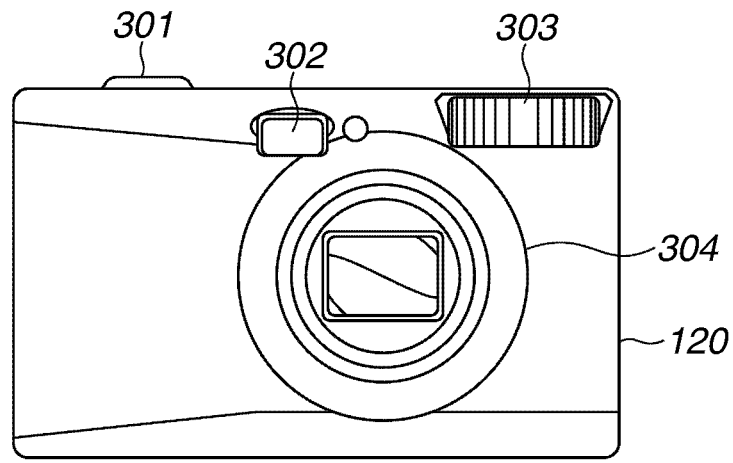
FIGS. 3A, 3B, and 3C illustrate external views of a digital camera according to the first exemplary embodiment.
Figure 3B:
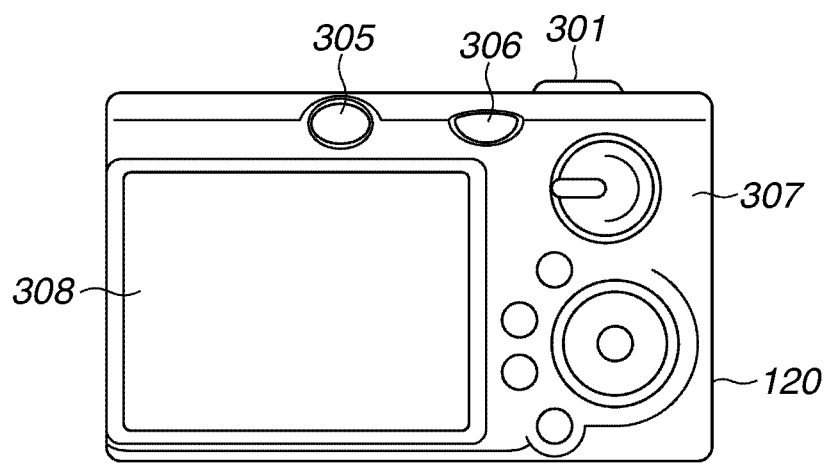
Figure 3C:
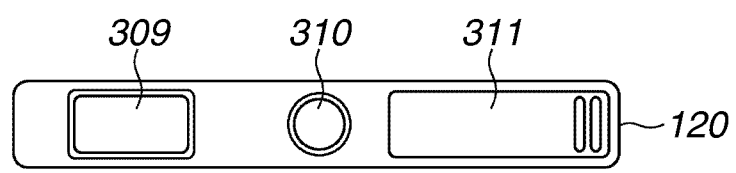

FIGS. 3A to 3C illustrate external views of the digital camera 120. The illustrations correspond to the front view, the rear view, and the bottom view of the digital camera 120, respectively.

A shutter button 301 is included in the operation unit 124. The shutter button 301 is a two-stage push button switch that detects the difference between half-press and full-press. If the shutter button 301 is half-pressed, an imaging preparation operation such as autofocus control is started. If the shutter button 301 is fully pressed, an imaging operation for capturing still image data is started. Through a viewfinder 302, the user can confirm the object image to determine the composition via a finder eyepiece unit 305 described below.

A flash unit 303 emits a flash light when necessary. It is useful in capturing unblurred still image even under low light conditions. A photographic lens 304 is included in the imaging unit 128. The user can optically confirm the object image through the finder eyepiece unit 305. A power button 306 is used for turning on/off the power of the digital camera 120. A group of buttons 307 is included in the operation unit 124. By using these buttons, the user can display the menu of the digital camera 120 or set various parameters.

A LCD 308 is used for the determination of the imaging range (determination of the composition) before the user starts the imaging. It is also used for displaying the operation menu described below and reproducing video data which has been captured. The display unit 125 is included in the LCD 308. A close-proximity wireless communication area 309 is where an antenna of the close-proximity wireless communication unit 132 is provided. If the antenna of the close-proximity wireless communication unit 109 of the cellular phone 100 comes nearer to this area of the digital camera 120, communication between the close-proximity wireless communication unit 132 and the close-proximity wireless communication unit 109 becomes possible. The range of the close-proximity wireless communication area 309 is not fixed and may vary depending on the external environment and the output power of the antenna. A threaded hole 310 is a portion to which a tripod is attached. A battery chamber 311 is where the user sets the battery 130 and the storage medium 127.

FIGS. 4A to 4D illustrate connection examples of the cellular phone 100, the digital camera 120, the AP 140, the mobile communication network 160, and the Internet 180. The connection associated with data communication will be described below.

Figure 4A:
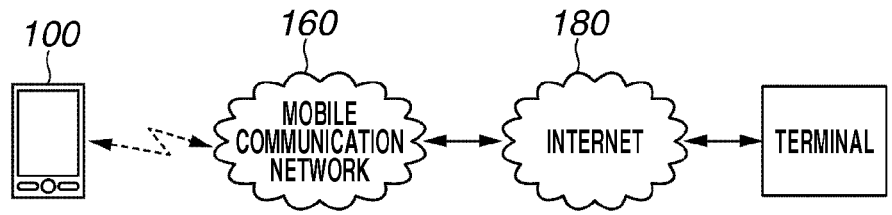
FIGS. 4A to 4D illustrate a network configuration according to the first exemplary embodiment.

FIG. 4A illustrates an example of the cellular phone 100 connected to the Internet 180 via the 3G network. In this case, the cellular phone 100 is connected to the mobile communication network 160 via the 3G communication unit 107. Further, the cellular phone 100 can communicate with a terminal on the Internet 180 via the mobile communication network 160. For example, the cellular phone 100 can receive content data from a server on the Internet and display it on the display unit 104. Furthermore, data stored in the cellular phone 100 can be transmitted to the server.

Figure 4B:
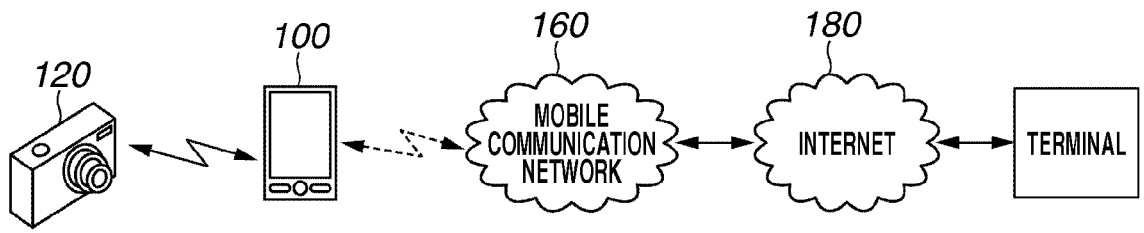

FIG. 4B illustrates a configuration example similar to the one illustrated in FIG. 4A except that the digital camera 120 is added. In this case, the digital camera 120 can communicate with the wireless LAN unit 108 of the cellular phone 100 via the wireless LAN unit 131. According to this network configuration, the cellular phone 100 starts the AP function of the wireless LAN so that the cellular phone 100 functions as an AP, and forms a wireless LAN network. The digital camera 120 participates in the wireless LAN network which has been formed and establishes communication with the cellular phone 100. According to this configuration, the digital camera 120 and the cellular phone 100 can transmit/receive data over the wireless LAN. On the other hand, the cellular phone 100 can be connected to the Internet 180 via the 3G network.

According to the present embodiment, although the cellular phone 100 is assigned to operate as an AP, the digital camera 120 can be used as an AP in place of the cellular phone 100. In this case, the digital camera 120 forms the wireless LAN network and the cellular phone 100 participates in the network. In either case, the cellular phone 100 can be concurrently connected to the digital camera 120 over the wireless LAN and the Internet 180 over the 3G network.

Further, a function called tethering can be used by the network configuration illustrated in FIG. 4B. The tethering function enables the digital camera 120 to communicate with a terminal on the Internet 180 via the mobile communication network 160 by using the cellular phone 100 as a relay point. If the tethering function is used, for example, the digital camera 120 can send data to a terminal on the Internet via the cellular phone 100.

The method for realizing the tethering function is as follows. The digital camera 120 sends data from the wireless LAN unit 131 to the wireless LAN unit 108 of the cellular phone 100. The cellular phone 100 determines whether the cellular phone 100 itself is the destination of the data which has been received by the wireless LAN unit 108. If the cellular phone 100 determines that the cellular phone 100 itself is not the destination of the data, the cellular phone 100 sends the data to the destination via the 3G communication unit 107. If the 3G communication unit 107 receives data whose destination is not the cellular phone 100 via the mobile communication network 160, the cellular phone 100 sends the data from the wireless LAN unit 108 to the wireless LAN unit 131 of the digital camera 120.

In this manner, the digital camera 120 can be indirectly connected to the Internet 180. When data is transferred via the wireless LAN unit 108 and the 3G communication unit 107, data conversion called Network Address Translation (NAT) may also be performed.

Figure 4C:
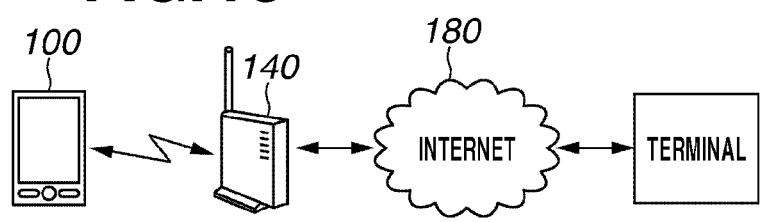

Next, the network configuration illustrated in FIG. 4C will be described. FIG. 4C illustrates a configuration where the cellular phone 100 is connected to the Internet 180 via the AP 140. In this case, the cellular phone 100 is connected to the AP 140 via the wireless LAN unit 108. Further, the cellular phone 100 can be connected to the Internet via the AP 140. Thus, as is the configuration illustrated in FIG. 4A, the cellular phone 100 can receive, for example, digital content data on the Internet and display it on the display unit 104 or transmit data which the cellular phone 100 stores to a terminal on the Internet. Since the configuration illustrated in FIG. 4C uses the wireless LAN, a faster transfer can be realized, compared to the configuration illustrated in FIG. 4A. On the other hand, if an AP is not located in the vicinity of cellular phone 100, the Internet connection via the wireless LAN will not be available. Thus, the advantage of the configuration illustrated in FIG. 4A is that it is free from location constraints.

Figure 4D:
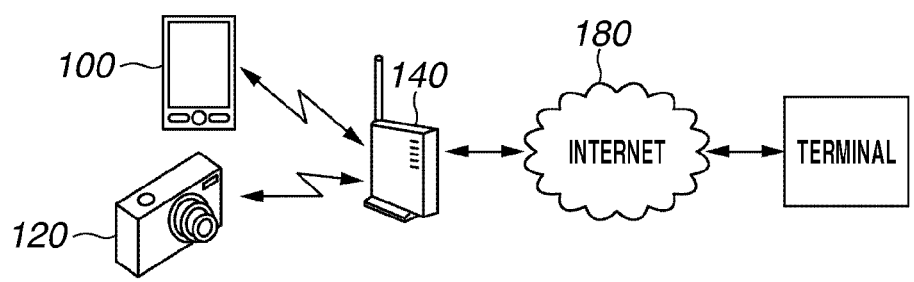

FIG. 4D illustrates an example similar to the configuration illustrated in FIG. 4C except that the digital camera 120 is added. In this case, the digital camera 120 is connected to the AP 140 via the wireless LAN unit 131. This means that both the cellular phone 100 and the digital camera 120 participate in the network formed by the AP 140. The digital camera 120 can communicate with a terminal on the Internet 180 via the AP 140. Further, the digital camera 120 can perform transmission/reception of data with the cellular phone 100 via the AP 140.

<Operation Description>

Next, the operation of each apparatus according to the present embodiment will be described in detail. The processing of the flowcharts below is realized by the CPU of each apparatus controlling each unit of the apparatus according to an input signal or a program.

First, the operation of the cellular phone 100 will be described in detail with reference to the flowchart in FIG. 5A. The flowchart is executed, for example, when the cellular phone 100 is started or the connection state of the wireless LAN is changed.

In step S501, the CPU 101 enables the communication function of the 3G communication unit 107 so that the cellular phone 100 can communicate with the mobile communication network 160.

In step S502, the CPU 101 searches for an AP in the periphery of the cellular phone 100 by using the wireless LAN unit 108 and determines whether it is a connectable AP. If a connectable AP is available (YES in step S502), the processing proceeds to step S503. If a connectable AP is not available (NO in step S502), the processing proceeds to step S506.

The processing on and after step S503 will now be described. The following description is based on the assumption that the AP 140 has been detected in step S502. In step S503, the CPU 101 sets the communication parameters necessary for the connection of the cellular phone 100 with the network formed by the AP 140 and connects the cellular phone 100 to the AP 140 via wireless LAN communication. To be more precise, a service set identifier (SSID), an encryption method, an authentication method, and a passphrase of the AP 140 are set on the cellular phone 100 side and sent to the AP 140. Then, the cellular phone 100 can be connected to the AP 140. The communication parameters can be set by the user operating the operation unit 105. Further, a communication parameter stored in advance in the non-volatile memory 103 can also be used. According to the present embodiment, the SSID of the AP 140 according to the present embodiment is "Home-AP".

In step S504, the CPU 101 stores the wireless LAN communication parameters including the SSID, encryption method, authentication method, and passphrase set in step S503 in the non-volatile memory 103.

In step S505, the CPU 101 determines that the wireless LAN is to be used for the subsequent data communication. At this point in time, the cellular phone 100 is connected to the network formed by the AP 140, and the network configuration is in the state illustrated in FIG. 4C.

Next, processing on and after step S506 will be described. In step S506, the CPU 101 determines whether the 3G network is available using the 3G communication unit 107. To be more precise, the CPU 101 determines whether the 3G communication unit 107 is receiving a signal greater than or equal to a predetermined strength from the mobile communication network 160. If the CPU 101 determines that the 3G communication unit 107 is receiving a signal greater than or equal to a predetermined strength, the CPU 101 determines that the 3G network is available (YES in step S506), and the processing proceeds to step S507. If the CPU 101 determines that the 3G communication unit 107 is receiving a signal less than a predetermined strength (e.g., in a state of no service where the signal from the mobile communication network 160 is extremely weak), the CPU 101 determines that the 3G network is not available (NO in step S506), and the processing ends.

In step S507, the CPU 101 determines that the 3G network is to be used for the subsequent data communication. At this point in time, the network configuration will be in a state illustrated in FIG. 4A.

As described above, the cellular phone 100 of the present embodiment determines whether to use the 3G network or the wireless LAN for data communication depending on whether a connectable AP exists in the periphery of the cellular phone 100.

Figure 6A:
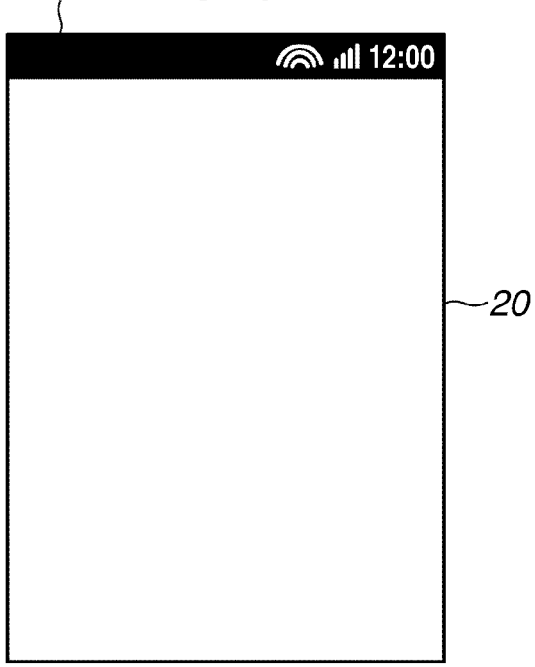
FIGS. 6A to 6D illustrate examples of a Graphical User Interface (GUI) of the cellular phone according to the first exemplary embodiment and a second exemplary embodiment.
Figure 6B:
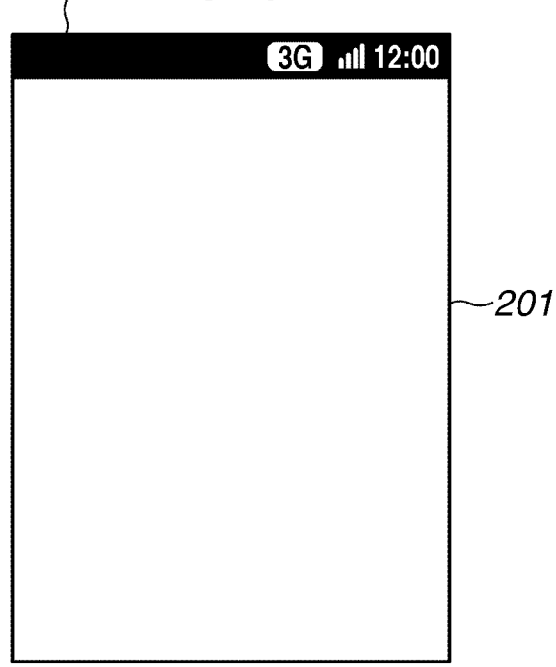

In step S508, the CPU 101 displays, on the display unit 104, information of the data communication method which is being used (wireless LAN or 3G). An example of the information display according to the present embodiment is illustrated in FIGS. 6A and 6B. The information is displayed at the top of the liquid crystal display 201 of the display unit 104. FIG. 6A illustrates the display in a case where the data communication is performed over the wireless LAN. An icon 601 is a wireless LAN icon indicating that the current setting is set for data communication over the wireless LAN. FIG. 6B illustrates the display in a case where the data communication is performed over the 3G network. An icon 602 is a 3G network icon indicating that the current setting is set for data communication over the 3G network. By confirming this icon, the user can easily determine the communication method used for the data communication.

Referring back again to FIG. 5A, after the determination of the communication method, in step S509, the CPU 101 determines whether an NFC device is detected. To be more precise, when the close-proximity wireless communication unit 109 and the close-proximity wireless communication unit 132 of the digital camera 120 are close enough that they can communicate with each other, the close-proximity wireless communication unit 109 detects the close-proximity wireless communication unit 132. If the CPU 101 determines that a NFC device is detected (YES in step S509), the processing proceeds to step S510. If the CPU 101 determines that a NFC device is not yet detected (NO in step S509), step S509 is repeated. The detection of the NFC device in this step can be constantly performed. Alternatively, it can be performed only when the user instructs the detection of the NFC device, for example, via a menu screen.

In step S510, the CPU 101 determines whether the current communication uses the wireless LAN. In other words, the CPU 101 determines whether the setting set in step S505 is used in the communication. If the CPU 101 determines that the current communication uses the wireless LAN (YES in step S510), the processing proceeds to step S511. If the CPU 101 determines that the current communication does not use the wireless LAN, in other words, the 3G network is used (NO in step S510), the processing proceeds to step S512.

A case where the processing proceeds to step S512 will be described. In step S512, the CPU 101 enables the AP function of the wireless LAN unit 108.

In step S513, the CPU 101 sets the communication parameters used for the connection to the network formed by the cellular phone 100 itself as an AP. More precisely, the CPU 101 determines the SSID, encryption method, authentication method, and passphrase. These communication parameters can be set by the user via the operation unit 105 or parameters fixed in advance can be used. Further, the SSID and the passphrase can be randomly determined. In this manner, a new wireless LAN network is formed by the AP function of the cellular phone 100. Since the cellular phone 100 functions as an AP, other wireless LAN apparatuses can be connected to the network formed by the cellular phone 100 in the infrastructure mode.

In step S514, the CPU 101 enables the network address translation (NAT) feature. When the NAT feature is enabled, the data received by the wireless LAN unit 108 or the 3G communication unit 107 can be transferred to another unit. If the tethering feature is not used, this processing is not always necessary.

In step S515, the CPU 101 sends the communication parameters set in step S513 to the digital camera 120 via the close-proximity wireless communication unit 109. In this step, the communication parameters used for the connection with the network formed by the AP function of the cellular phone 100 is handed over to the digital camera 120 via the NFC. Accordingly, the digital camera 120 can share the communication parameters with the cellular phone 100 and participate in the network formed by the cellular phone 100. Exemplary operations of the digital camera 120 will be described below. In this stage, the connection configuration such as the one illustrated in FIG. 4B is established. In other words, the cellular phone 100 is connected to the digital camera 120 via the wireless LAN and connected to the mobile communication network 160 via the 3G network.

In step S516, the CPU 101 sends an IP address set for the wireless LAN unit 108 of the cellular phone 100 to the digital camera 120 via the close-proximity wireless communication unit 109. In step S517, the CPU 101 receives the IP address set for the wireless LAN unit 131 of the digital camera 120 from the close-proximity wireless communication unit 132 via the close-proximity wireless communication unit 109. According to such processing, the cellular phone 100 and the digital camera 120 can easily establish communication by the wireless LAN. The exchange of IP addresses is not necessarily performed via the NFC. For example, discovery processing used for searching a device on the network can be executed via the wireless LAN. Processing after this processing until the communication between the devices is established by using the exchanged IP addresses can be automatically performed. Then, the cellular phone 100 and the digital camera 120 can be set in a data communicable state by the user of the digital camera 120 bringing the digital camera closer to the cellular phone 100 or vice versa.

Next, a case where the processing proceeds to step S511 will be described. In step S511, the CPU 101 sends a message to the digital camera 120 using the close-proximity wireless communication unit 109 that the cellular phone 100 is already communicating with an external AP. In this stage, the digital camera 120 cannot communicate with the cellular phone 100 by the wireless LAN. However, by the message sent in step S511, the digital camera 120 can recognize that the unestablished communication via the wireless LAN is caused by the cellular phone 100 being connected to the external AP. Specific operations of the digital camera 120 will be described below.

The operation of the cellular phone 100 according to the present embodiment is as described above. Next, the operation of the digital camera 120 will be described in detail.

Figure 7A:
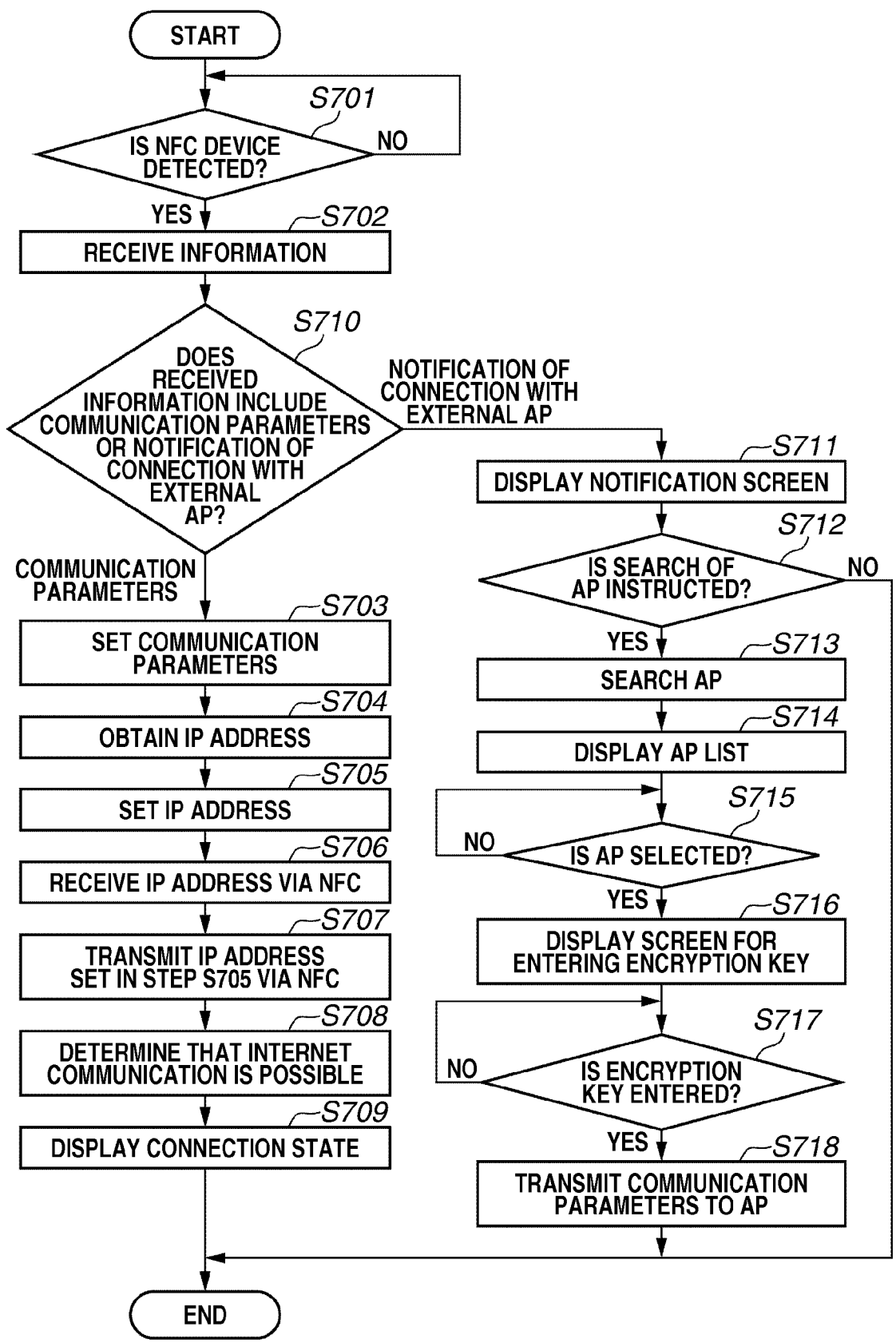

FIG. 7A is a flowchart illustrating the operation of the digital camera 120 according to the present embodiment. This flowchart is executed, for example, when the digital camera 120 is started or the connection state of the wireless LAN is changed. Further, the flowchart is executed when the user instructs the setting of the wireless LAN via the NFC from a menu screen.

In step S701, the CPU 121 determines whether a NFC device is detected. If a NFC device is detected (YES in step S701), the processing proceeds to step S702. If a NFC device is not detected (NO in step S701), the processing in step S701 is repeated.

In step S702, the CPU 121 receives information sent from the NFC device which has been detected via the close-proximity wireless communication unit 132.

In step S710, the CPU 121 determines the type of information received in step S702. If the CPU 121 determines that the information includes communication parameters, the processing proceeds to step S703. These communication parameters are those transmitted from the cellular phone 100 in step S515 in FIG. 5A. On the other hand, if the CPU 121 determines that the information is a notification informing that the cellular phone 100 is connected to an external AP, the processing proceeds to step S711. The communication parameters included in the notification are those sent from the cellular phone 100 in step S511 in FIG. 5A.

Next, a case where the processing proceeds to step S703 will be described. In step S703, according to the communication parameters received in step S702, the CPU 121 sets the communication settings by the wireless LAN unit 131. Then, the digital camera 120 can be connected to the network.

When the processing proceeds from step S710 to step 703, since the communication parameters received in step S710 are the communication parameters for the connection to the network formed by the AP function of the cellular phone 100, the digital camera 120 will be connected to the network formed by the AP function of the cellular phone 100. In this case, the network configuration illustrated in FIG. 4B will be established.

In step S704, the CPU 121 receives the IP address sent from the device (the cellular phone 100) to which the digital camera 120 is connected. A dynamic host configuration protocol (DHCP) protocol or an Auto IP protocol is used in receiving the IP address.

In step S705, the CPU 121 stores the IP address obtained in step S704 in the non-volatile memory 123 and sets it as the IP address of the digital camera 120.

In step S706, the CPU 121 receives the IP address of the cellular phone 100 via the close-proximity wireless communication unit 132. This IP address is the address the cellular phone 100 transmits in step S516 in FIG. 5A.

In step S707, the CPU 121 transmits the IP address set in step S705 to the close-proximity wireless communication unit 109 via the close-proximity wireless communication unit 132. The IP address sent in this step is received by the cellular phone 100 in step S517 in FIG. 5A.

In step S708, the CPU 121 determines whether the digital camera 120 can communicate with a terminal on the Internet 180. More particularly, the CPU 121 determines whether the digital camera 120 can normally communicate with a particular host computer on the Internet.

Figure 8A:
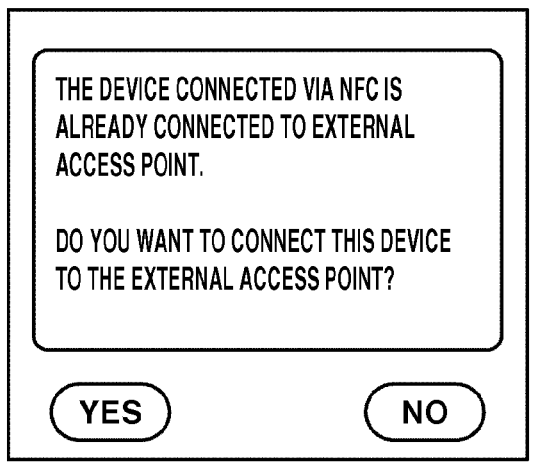
FIGS. 8A to 8D illustrate examples of the GUI of the digital camera according to the first and the second exemplary embodiments.
Figure 8B:
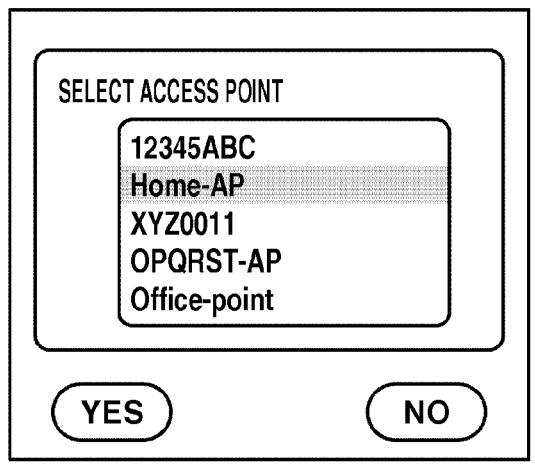
Figure 8C:
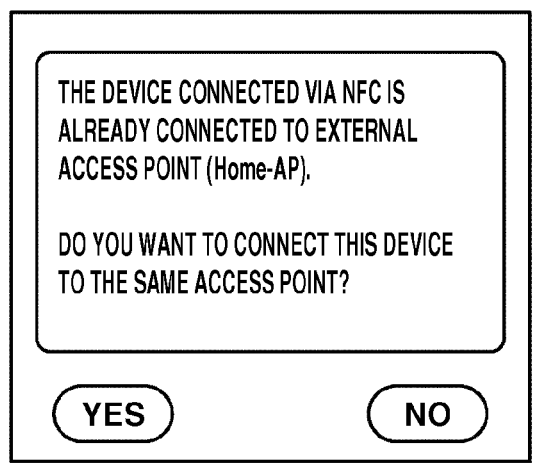
Figure 8D:
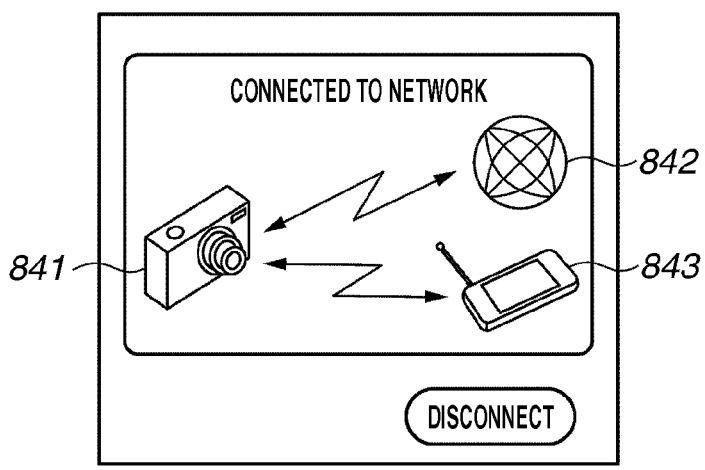

In step S709, the CPU 121 displays a GUI that shows the current network state on the display unit 125. FIG. 8D illustrates an example of the GUI which is displayed on the display unit 125 in step S709. In FIG. 8D, a digital camera 841, which corresponds to the digital camera 120, is communicable with the Internet 842, which corresponds to the Internet 180, and a cellular phone 843, which corresponds to the cellular phone 120. As a result of the processing in step S708, if it is determined that the digital camera 120 cannot communicate with a host computer on the Internet, the illustration of the Internet 842 is not displayed on the screen. Further, if the tethering is not performed, steps S708 and S709 are not necessary.

Next, a case where the processing proceeds from step S710 to S711 is described. In step S711, the CPU 121 displays a message on the screen of the display unit 125 that notifies the user that the cellular phone 100 is connected to an external AP. An example of the screen is illustrated in FIG. 8A. The screen illustrated in FIG. 8A displays a message that the cellular phone 100 is already connected to an external AP as well as a message asking if the user wishes to connect the digital camera 120 to the AP. In this manner, since the information sent from the cellular phone 100 is displayed on the screen, the user of the digital camera 120 can easily recognize that the cellular phone 100 is already connected to an external AP.

In step S712, the CPU 121 determines whether the user has instructed the digital camera to search an AP in the periphery. According to the example in FIG. 8A, a "YES" button serves as an instruction device used for instructing the search. If the user selects the "YES" button on the screen in FIG. 8A, the search instruction is input. If the CPU 121 determines that the instruction has been input (YES in step S712), the processing proceeds to step S713. If a "NO" button is selected or a predetermined length of time elapses without a user operation (NO in step S712), the processing ends.

In step S713, the CPU 121 searches for an AP in the periphery. The CPU 121 recognizes the existence of an AP in the periphery by receiving a signal which the AP emits at regular intervals.

In step S714, the CPU 121 displays a list of APs obtained by the search. An example of the list is illustrated in FIG. 8B. The user can select a desirable AP from the list. A case where the user selected "Home-AP", which for discussion purposes is the SSID of the AP 140, will be described below.

In step S715, the CPU 121 determines whether an AP is selected from the list. If the CPU 121 determines that an AP is selected from the list (YES in step S715), the processing proceeds to step S716. If the CPU 121 determines that an AP is not selected from the list (NO in step S715), step S715 is repeated.

In step S716, the CPU 121 displays a screen on the display unit 125 for entering an encryption key used to connect to the selected AP 140.

In step S717, the CPU 121 determines whether an encryption key has been entered. If the CPU 121 determines that an encryption key has been entered (YES in step S717), the processing proceeds to step S718. If the CPU 121 determines that an encryption key has not been entered (NO in step S717), the processing in step S717 is repeated.

In step S718, the CPU 121 sends communication parameters, including the encryption key, to the selected AP 140 via the wireless LAN unit 131. When the communication parameters are received by the AP 140, and the authentication is successfully completed, the digital camera 120 can connect to the network formed by the AP 140.

In another embodiment, instead of selecting an AP from a list such as the one illustrated in FIG. 8B, the digital camera 120 automatically connects to an AP to which the digital camera recently connected to, based on a connection history. In this case, however, the AP to which the digital camera 120 connects to is not always the AP 140 to which the cellular phone 100 is connected to. Thus, even if the digital camera 120 has an auto-connection function, if the connection setup is performed using the NFC as described above, it is convenient to display the list so that the user can select an AP from the list.

As described above, the cellular phone 100 according to the present embodiment notifies the digital camera 120 that it is connected to an external AP if it is already connected to such an AP. Further, when the digital camera 120, according to the present embodiment, receives a notification from the cellular phone 100, the digital camera 120 displays a screen displaying a message that a notification from the cellular phone 100 has been received. In this manner, the user of the digital camera 120 can easily recognize that the digital camera 120 cannot be directly connected to the cellular phone 100 by the wireless LAN.

Further, the digital camera 120 according to the present embodiment displays a message indicating that the cellular phone 100 is already connected to an external AP, as well as a GUI that can be used for searching an AP in the periphery. In this manner, with minimum operations by the user, the digital camera 120 can be easily connected to the AP 140. Further, if the digital camera 120 is connected to the AP 140, the digital camera 120 can communicate with the cellular phone 100 via the AP 140.

Further, in step S511, the CPU 101 can also transmit the IP address of the cellular phone 100 to the digital camera 120 via the NFC. Then, for example, after the digital camera 120 is connected to the AP 140, the digital camera 120 can automatically search the cellular phone 100 and communication can be established.

Next, a second exemplary embodiment will be described. In the present embodiment, descriptions of components similar to those of the first exemplary embodiment are not repeated and just those unique to the present embodiment will be described.

<Operation Description>

The operation of the cellular phone 100 according to the present embodiment will be described in detail with reference to the flowchart in FIG. 5B.

Since steps S551 to S560 are similar to the processing performed in steps S501 to S510 in FIG. 5A, their descriptions are not repeated herein.

Further, since steps S562 to S564 and S569, which are steps performed when the current communication network is determined as the 3G network in step S560, are similar to those described with reference to steps S512 to S515 in FIG. 5A, their descriptions are also not repeated herein.

A case where the current communication method is determined as the wireless LAN in step S560 will now be described.

In step S561, the CPU 101 reads out the communication parameters, including the SSID, encryption method, authentication method, and passphrase stored in the non-volatile memory 103 in step S554.

In step S565, the CPU 101 sends the communication parameters read out in step S561 to the digital camera 120 using the close-proximity wireless communication unit 109. That is, in this step, the communication parameters necessary for the connection to the network formed by the AP 140 are provided to the digital camera 120 via the NFC. By using the provided communication parameters, the digital camera 120 can participate in the network formed by the AP 140. The operations of the digital camera 120 will be described below.

All of the communication parameters are not necessarily transmitted in step S565. For example, security information, such as the encryption key, may not be transmitted via the close-proximity wireless communication unit 109. The cellular phone 100 can wait until the encryption key is sent from the digital camera 120 after this step.

Further, before executing the processing in step S565, the cellular phone 100 can accept the confirmation of the user. For example, the CPU 101 can display a screen on the display unit 104 that includes the SSID of the AP 140, such as the one illustrated in FIG. 8C. If the "YES" button is selected, the processing in this step can be executed.

The connection configuration established in this stage is illustrated in FIG. 4D. In other words, the cellular phone 100 and the digital camera 120 are connected to the AP 140 via the wireless LAN. Even if the connection configuration is such as the one illustrated in FIG. 4D, the cellular phone 100 can perform data communication with the digital camera 120 via the AP 140. In other words, while maintaining the wireless LAN communication with the AP 140, the cellular phone 100 can communicate with the digital camera 120 by the wireless LAN.

In step S566, the CPU 101 transmits the IP address set for the wireless LAN unit 108 of the cellular phone 100 from the close-proximity wireless communication unit 109 to the close-proximity wireless communication unit 132. In step S567, the CPU 101 receives the IP address set for the wireless LAN unit 131 and sent from the close-proximity wireless communication unit 132 via the close-proximity wireless communication unit 109. According to the processing in steps S566 and S567, the cellular phone 100 and the digital camera 120 can easily establish the communication by the wireless LAN. The exchange of IP addresses is not necessarily performed via the NFC, and discovery processing using the wireless LAN can be used.

In step S568, the CPU 101 displays a GUI indicating the current connection state of the network on the display unit 104. Operations associated with the display of the GUI will be described below.

Figure 6C:
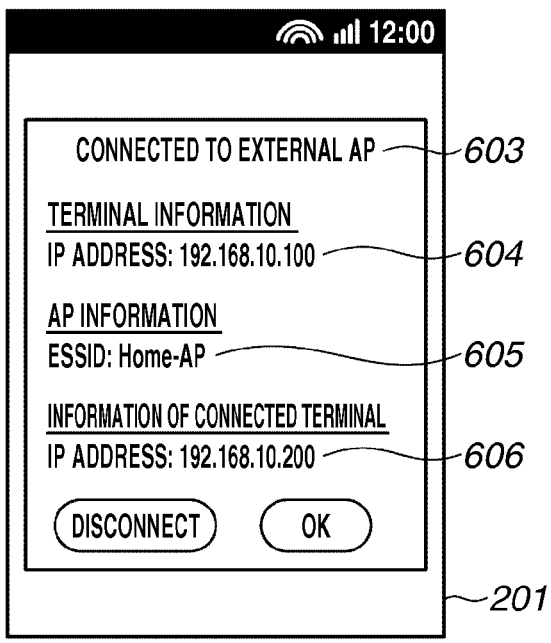

First, a case where the cellular phone 100 provides the communication parameters of the AP 140 to the digital camera 120 in step S565 will be described. In this case, the CPU 101 displays a GUI, such as the one illustrated in FIG. 6C, on the display unit 104. In FIG. 6C, a message 603 indicates that the cellular phone is connected to an AP. An IP address 604 is the IP address of the cellular phone 100 transmitted in step S566. A SSID 605 is the SSID of the AP 140 and an IP address 605 is the IP address of the digital camera 120 received in step S567. According to the display of the GUI illustrated in FIG. 6C, the user can easily understand that the cellular phone 100 can communicate with the digital camera 120 via the AP 140.

Figure 6D:
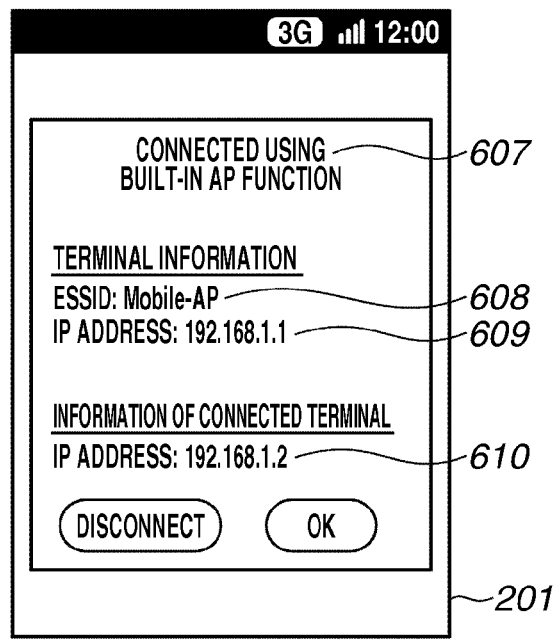

A case where the communication parameters of the cellular phone 100 is provided in step S569 will be described. In this case, the CPU 101 displays a GUI such as the one displayed in FIG. 6D on the display unit 104. A message 607 indicates that the cellular phone is connected using the built-in AP, a SSID 608 is the SSID of the cellular phone 100, an IP address 609 is the IP address of the cellular phone 100 transmitted in step S566, an IP address 610 is the IP address of the digital camera 120 received in step S567. Unlike the GUI in FIG. 6C, the GUI in FIG. 6D shows the SSID of the wireless LAN unit 108 set in step S63. According to the display of the GUI illustrated in FIG. 6D, the user can easily understand that the cellular phone 100 can communicate with the digital camera 120 using the AP function of the cellular phone 100.

The operation of the cellular phone 100 is as described above. Next, the operation of the digital camera 120 will be described.

FIG. 7B is a flowchart illustrating the operation of the digital camera 120. This flowchart is executed when the digital camera 120 is started, the connection state of the wireless LAN is changed, or the wireless setting by the NFC is instructed by a menu operation.

In step S751, the CPU 121 determines whether a NFC device is detected. If a NFC device is detected (YES in step S751), the processing proceeds to step S752. If a NFC device is not detected (NO in step S751), the processing in step S751 is repeated.

In step S752, the CPU 121 receives the communication parameters sent from the cellular phone 100 via the close-proximity wireless communication unit 132. The communication parameters received by the CPU 121 are those sent in either step S565 or S569 in FIG. 5B.

In step S753, according to the communication parameters received in step S752, the CPU 121 sets the communication settings by the wireless LAN unit 131. Then, the digital camera 120 can be connected to the network.

If the communication parameters received in step S752 are those sent in step S565, the communication parameters are sent for the connection to the network formed by the AP 140. Thus, the digital camera 120 will be connected to the network formed by the AP 140 in step S753. In this case, the network configuration illustrated in FIG. 4D will be established.

On the other hand, if the communication parameters received in step S752 are those sent in step S569, the communication parameters are sent for the connection to the network formed by the AP function of the cellular phone 100. Thus, the digital camera 120 will be connected to the network formed by the AP function of the cellular phone 100 in step S753. In this case, the network configuration illustrated in FIG. 4B will be established. If the tethering function is to be used, a message notifying that the tethering is enabled can be sent from the cellular phone 100 to the digital camera 120 at this timing.

In step S754, the CPU 121 receives the IP address sent from the device (the AP 140 or the cellular phone 100) to which the digital camera 120 is connected. A dynamic host configuration protocol (DHCP) protocol or an Auto IP protocol is used in receiving the IP address.

In step S755, the CPU 121 stores the IP address obtained in step S754 in the non-volatile memory 123 and sets it as the IP address of the digital camera 120.

In step S756, the CPU 121 receives the IP address of the cellular phone 100 via the close-proximity wireless communication unit 132. This IP address is the address the cellular phone 100 transmits in step S566 in FIG. 5B.

In step S757, the CPU 121 transmits the IP address set in step S755 to the close-proximity wireless communication unit 109 via the close-proximity wireless communication unit 132. The IP address sent in this step is received by the cellular phone 100 in step S567 in FIG. 5B.

In step S758, the CPU 121 determines whether the digital camera 120 can communicate with a terminal on the Internet 180. More particularly, the CPU 121 determines whether the digital camera 120 can normally communicate with a particular host computer on the Internet to which communication has been conducted.

In step S759, the CPU 121 displays a GUI that shows the current network state on the display unit 125. FIG. 8D illustrates an example of the GUI which is displayed on the display unit 125 in step S709. In FIG. 8D, the digital camera 841, which corresponds to the digital camera 120, is communicable with the Internet 842, which corresponds to the Internet 180, and the cellular phone 843, which corresponds to the cellular phone 120. As a result of the processing in step S758, if it is determined that the digital camera 120 cannot communicate with a host computer on the Internet, the illustration of the Internet 842 is not displayed on the screen. Further, if the tethering is not performed, steps S758 and S759 are not necessary.

The operation of the digital camera 120 is as described above. The digital camera 120 can establish communication with the cellular phone 100 over the wireless LAN regardless of whether the network configuration of the cellular phone 100 before the NFC is the configuration illustrated in FIG. 4A or the configuration illustrated in FIG. 4C. This is because the cellular phone 100 changes the communication parameters which are sent to the digital camera 120 according to the network configuration of the cellular phone 100.

According to the present embodiment, communication parameters can be smoothly provided via the NFC between a cellular phone having two communication functions (wireless LAN and 3G) and a digital camera having a wireless LAN function.

According to the above-described exemplary embodiment, a case where the cellular phone 100 functions as an AP has been described. As described above, however, the digital camera 120 can also function as an AP. In this case, the processing performed by the cellular phone 100 in FIGS. 5A and 5B as an AP will be performed by the digital camera 120. Further, the connection processing to the cellular phone 100 as an AP performed by the digital camera 120 in FIGS. 7A and 7B will be performed by the cellular phone 100.

In place of the cellular phone 100 used in the above-described exemplary embodiments, an apparatus such as a personal computer, media player, media server, personal digital assistant (PDA), tablet terminal, or game machine can be used.

Further, in place of the digital camera 120 used in the above-described exemplary embodiment, an apparatus such as a personal computer, media player, media server, PDA tablet terminal, camera-equipped cellular phone, or game machine can be used.

Furthermore, in place of the 3G communication network used in the above-described exemplary embodiments, WiMAX, LTE, PHS, GSM®, and other communication methods employing 4G technology can be used in the connection to the mobile communication network.

Wireless communication methods such as Bluetooth® can be used in place of the wireless LAN (standards 802.11a/b/g/n) used in the above-described exemplary embodiments.

Further, according to the above-described exemplary embodiments, wireless LAN communication parameters such as SSID, encryption method, authentication method, and passphrase are used as the communication parameters. However, the communication parameters of the above-described exemplary embodiments are not limited to such examples, and other parameters such as a user name or a password can also be used.

According to the above-described exemplary embodiments, direct communication with a digital camera is realized by using the AP function of a cellular phone, however, the communication can also be established using the ad hoc mode.

Other Embodiments

Additional embodiments can also be realized by a computer of a system or apparatus that reads out and executes computer executable instructions recorded on a storage medium (e.g., computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-127383 filed Jun. 4, 2012, which is hereby incorporated by reference herein in its entirety.

What is claimed is:

1. A communication apparatus comprising:
a first communication unit configured to communicate with a communication network which is generated by another apparatus; and
a second communication unit configured to communicate with an external apparatus via close-proximity wireless communication, the external apparatus being different from the another apparatus;
wherein in a case where a proximity of the external apparatus is detected by the second communication unit while the communication apparatus is not connected to the communication network, the first communication unit performs as a wireless access point by generating a new communication network of an infrastructure mode using a communication parameter, and the second communication unit transmits the communication parameter to the external apparatus via close-proximity wireless communication, and
wherein in a case where the proximity of the external apparatus is detected by the second communication unit while the communication apparatus is connected to the communication network generated by the another apparatus, the second communication unit transmits a notification to the external apparatus indicating that the communication apparatus is already connected, before the detection of the proximity of the external apparatus, to the communication network generated by the another apparatus.

2. The communication apparatus according to claim 1, wherein in a case where the proximity of the external apparatus is detected by the second communication unit when the communication apparatus is connected to the communication network generated by the another apparatus, the second communication unit shares a communication parameter for the connection to the communication network generated by the another apparatus.

3. The communication apparatus according to claim 1, wherein the communication parameter includes an ID and an encryption key of the new communication network.

4. The communication apparatus according to claim 1, wherein the notification includes an ID of the communication network generated by the another apparatus and not includes an encryption key of the communication network generated by the another apparatus.

5. The communication apparatus according to claim 1, wherein the communication network is a local area network.

6. The communication apparatus according to claim 1, wherein the communication parameter does not include an ID and an encryption key of the new communication network, and
the communication unit performs a device discovery process after the external apparatus joins the new communication network.

7. The communication apparatus according to claim 1, wherein the second communication unit performs communication via Near Field Communication (NFC).

8. The communication apparatus according to claim 1, wherein the second communication unit transmits an IP address of the communication apparatus in the communication network generated by the another apparatus.

9. The communication apparatus according to claim 1, wherein the second communication unit receives an IP address of the external apparatus in the communication network generated by the another apparatus.

10. The communication apparatus according to claim 1, wherein the communication apparatus is a cellular phone.

11. The communication apparatus according to claim 1, wherein the external apparatus is an imaging apparatus.

12. The communication apparatus according to claim 1, further comprising
a mobile communication unit configured to perform a data communication and a speech communication via a mobile communication network; and
a control unit configured to control the data communication to be performed via the first communication unit in a case where the communication apparatus is connected to the communication network, and to control the data communication to be performed via the mobile communication unit in a case where the communication apparatus is not connected to the communication network.

13. A control method for a communication apparatus including a first communication unit configured to communicate with a communication network which is generated by another apparatus, and a second communication unit configured to communicate with an external apparatus via close-proximity wireless communication, the external apparatus being different from the another apparatus, the method comprising:
performing by the first communication unit as an wireless access point by generating a new communication network of an infrastructure mode using a communication parameter and transmitting by the second communication unit the communication parameter to the external apparatus via close-proximity wireless communication, in a case where a proximity of the external apparatus is detected while the communication apparatus is not connected to the communication network, and
transmitting, in a case where the proximity of the external apparatus is detected by the second communication unit while the communication apparatus is connected to the communication network generated by the another apparatus, a notification to the external apparatus indicating that the communication apparatus is already connected, before the detection of the proximity of the external apparatus, to the communication network generated by the another apparatus.

14. A non-transitory computer-readable storage medium storing a program for causing a communication apparatus including a first communication unit configured to communicate with a communication network which is generated by another apparatus, and a second communication unit configured to communicate with an external apparatus via close-proximity wireless communication, the external apparatus being different from the another apparatus, to execute a method, the method comprising:
performing by the first communication unit as an wireless access point by generating a new communication network of an infrastructure mode using a communication parameter and transmitting by the second communication unit the communication parameter to the external apparatus via close-proximity wireless communication, in a case where a proximity of the external apparatus is detected while the communication apparatus is not connected to the communication network, and
transmitting, in a case where the proximity of the external apparatus is detected by the second communication unit while the communication apparatus is connected to the communication network generated by the another apparatus, a notification to the external apparatus indicating that the communication apparatus is already connected, before the detection of the proximity of the external apparatus, to the communication network generated by the another apparatus.

15. A communication apparatus comprising:
a first communication unit configured to communicate with a communication network which is generated by another apparatus; and
a second communication unit configured to communicate with an external apparatus via close-proximity wireless communication, the external apparatus being different from the another apparatus;
wherein in a case where a proximity of the external apparatus is detected by the second communication unit while the communication apparatus is not connected to the communication network, the first communication unit performs as a wireless access point by generating a new communication network of an infrastructure mode using a communication parameter, and the second communication unit transmits the communication parameter to the external apparatus via close-proximity wireless communication, and
wherein in a case where the proximity of the external apparatus is detected by the second communication unit while the communication apparatus is connected to the communication network generated by the another apparatus, the second communication unit transmits to the external apparatus a notification corresponding to that the communication apparatus is already connected, before the detection of the proximity of the external apparatus, to the communication network generated by the another apparatus.

16. The communication apparatus according to claim 15, wherein the communication parameter includes an ID and an encryption key of the new communication network.

17. The communication apparatus according to claim 15, wherein the communication network is a local area network.

18. The communication apparatus according to claim 15, wherein the second communication unit performs communication via Near Field Communication (NFC).

19. The communication apparatus according to claim 15, wherein the external apparatus is an imaging apparatus.

20. The communication apparatus according to claim 15, wherein in the case where the proximity of the external apparatus is detected by the second communication unit while the communication apparatus is not connected to the communication network, the second communication unit transmits an IP Address of the communication apparatus to the external apparatus via close-proximity wireless communication.

21. The communication apparatus according to claim 15, wherein a communication range of the first communication unit is broader than a communication range of the second communication unit.

22. The communication apparatus according to claim 15, further comprising:
a display unit,
wherein the display unit displays a wireless LAN icon which indicates a setting of the first communication unit while the first communication unit communicates with the communication network.

23. The communication apparatus according to claim 15, wherein the new parameter is generated randomly.

24. A control method for a communication apparatus including a first communication unit configured to communicate with a communication network which is generated by another apparatus, and a second communication unit configured to communicate with an external apparatus via close-proximity wireless communication, the external apparatus being different from the another apparatus, the method comprising:
performing by the first communication unit as an wireless access point by generating a new communication network of an infrastructure mode using a communication parameter and transmitting by the second communication unit the communication parameter to the external apparatus via close-proximity wireless communication, in a case where a proximity of the external apparatus is detected while the communication apparatus is not connected to the communication network, and
transmitting to the external apparatus, in a case where the proximity of the external apparatus is detected by the second communication unit while the communication apparatus is connected to the communication network generated by the another apparatus, a notification corresponding to that the communication apparatus is already connected, before the detection of the proximity of the external apparatus, to the communication network generated by the another apparatus.

25. A non-transitory computer-readable storage medium storing a program for causing a communication apparatus including a first communication unit configured to communicate with a communication network which is generated by another apparatus, and a second communication unit configured to communicate with an external apparatus via close-proximity wireless communication, the external apparatus being different from the another apparatus, to execute a method, the method comprising:
performing by the first communication unit as an wireless access point by generating a new communication network of an infrastructure mode using a communication parameter and transmitting by the second communication unit the communication parameter to the external apparatus via close-proximity wireless communication, in a case where a proximity of the external apparatus is detected while the communication apparatus is not connected to the communication network, and
transmitting to the external apparatus, in a case where the proximity of the external apparatus is detected by the second communication unit while the communication apparatus is connected to the communication network generated by the another apparatus, a notification corresponding to that the communication apparatus is already connected, before the detection of the proximity of the external apparatus, to the communication network generated by the another apparatus.

* * * * *